(12) United States Patent
Jessop et al.

(10) Patent No.: US 11,529,750 B2
(45) Date of Patent: Dec. 20, 2022

(54) COLLAPSIBLE MITER SAW TABLE SYSTEMS

(71) Applicant: CUTHUB, INC., Victor, MT (US)

(72) Inventors: David P. Jessop, Victor, MT (US); Sanford K. Jessop, Victor, MT (US)

(73) Assignee: CUTHUB, INC., Victor, MT (US)

( * ) Notice: Subject to any disclaimer, the term of this patent is extended or adjusted under 35 U.S.C. 154(b) by 705 days.

(21) Appl. No.: 16/572,291

(22) Filed: Sep. 16, 2019

(65) Prior Publication Data

US 2020/0122352 A1 Apr. 23, 2020

Related U.S. Application Data

(60) Provisional application No. 62/731,406, filed on Sep. 14, 2018.

(51) Int. Cl.
*B27B 5/18* (2006.01)
*B27B 5/29* (2006.01)
*B23D 47/02* (2006.01)

(52) U.S. Cl.
CPC ............ *B27B 5/187* (2013.01); *B23D 47/025* (2013.01); *B27B 5/29* (2013.01)

(58) Field of Classification Search
CPC .......... B27B 5/187; B27B 5/29; B23D 47/025
See application file for complete search history.

(56) References Cited

U.S. PATENT DOCUMENTS

| 3,044,507 | A | * | 7/1962 | Esposito | ................. B27B 5/187 83/471.2 |
|---|---|---|---|---|---|
| 3,406,728 | A | * | 10/1968 | Rost | ........................ B27B 5/187 83/466.1 |
| 2012/0312140 | A1 | * | 12/2012 | Rybka | .................. B23D 47/025 83/471.3 |
| 2017/0341258 | A1 | * | 11/2017 | Chang | .................. B23D 47/025 |
| 2019/0039157 | A1 | * | 2/2019 | Hanrahan | .............. B23D 51/02 |
| 2019/0240858 | A1 | * | 8/2019 | Torres | ....................... B27B 5/29 |
| 2019/0344365 | A1 | * | 11/2019 | Chan | ....................... B27B 27/10 |
| 2020/0130168 | A1 | * | 4/2020 | Van Bergen | ......... B25H 1/0042 |

* cited by examiner

*Primary Examiner* — Omar Flores Sanchez
(74) *Attorney, Agent, or Firm* — Bretton L. Crockett; TechLaw Ventures, PLLC (57) ABSTRACT

Collapsible and transportable systems for supporting miter saw assemblies. In one illustrative embodiment, a table assembly has two opposite main nodes at either end that support an upper bench top therebetween. Two legs extend from each main node to support the table. Two parallel support members extends through the main nodes underneath the bench top. A saw support table may be removably securable to the parallel support members extending out past the bench and allows a miter saw secured thereto to be adjusted such that the miter saw cutting table is co-planar with the bench top. A sliding locking member may be attached to the bench top to define a fixed distance for the length of material being cut. A second saw support table may be disposed on folding adjustable legs attached to the legs extending from a main node to support a table saw coplanar with the bench top.

20 Claims, 8 Drawing Sheets

COLLAPSIBLE MITER SAW TABLE SYSTEMS

CROSS-REFERENCE TO RELATED APPLICATION

This application claims the benefit of U.S. Provisional Patent Application No. 62/731,406 filed on Sep. 14, 2018, which is incorporated by reference herein in its entirety, including but not limited to those portions that specifically appear hereinafter, the incorporation by reference being made with the following exception: In the event that any portion of the above-referenced application is inconsistent with this application, this application supersedes said above-referenced application.

TECHNICAL FIELD

The present disclosure relates to apparatus, systems and methods for supporting power saws, especially miter saws.

BACKGROUND

Typical miter saw stands are either fixed tables that are intended for use at a single location or are small stands to which a saw assembly is attached that may be loaded into a truck or trailer for transport but lacks an adjoining work surface for supporting cut materials.

A collapsible system for supporting a miter saw that could be used to make repeated identical cuts to materials in order to facilitate construction at job sites would be an improvement in the art. Such a system that could be used with a power table saw would be a further improvement in the art.

SUMMARY

The present disclosure includes collapsible and transportable systems for supporting miter saw assemblies. In a first embodiment, a table assembly may have two opposite main nodes at either end that support an upper bench top therebetween. Two legs extend from each main node to support the table. Two parallel support members extends through the main nodes underneath the bench top. A saw support table is removably securable to the parallel support members extending out past the bench and allows a miter saw secured thereto to be adjusted such that the miter saw cutting table is co-planar with the bench top. A sliding locking member may be attached to the bench top to define a fixed distance for the length of material being cut. The parallel support members may extend to a second table assembly on an opposite side of the saw support table.

In some embodiments, a second saw support table secured to a portable table saw may be disposed on folding adjustable legs attached to the legs extending from a main node with the table saw table coplanar with the bench top. Additional work surface supports may be placed over the parallel support members to support an additional work surface parallel to the bench top.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

DETAILED DESCRIPTION

The present disclosure relates to apparatus, systems and methods for collapsible support systems for miter saws and other power tools. It will be appreciated by those skilled in the art that the embodiments herein described, while illustrating certain embodiments, are not intended to so limit the disclosure or the scope of the invention. Those skilled in the art will also understand that various combinations or modifications of the embodiments presented herein can be made without departing from the scope of this disclosure. All such alternate embodiments are within the scope of the present invention.

Figure 1:
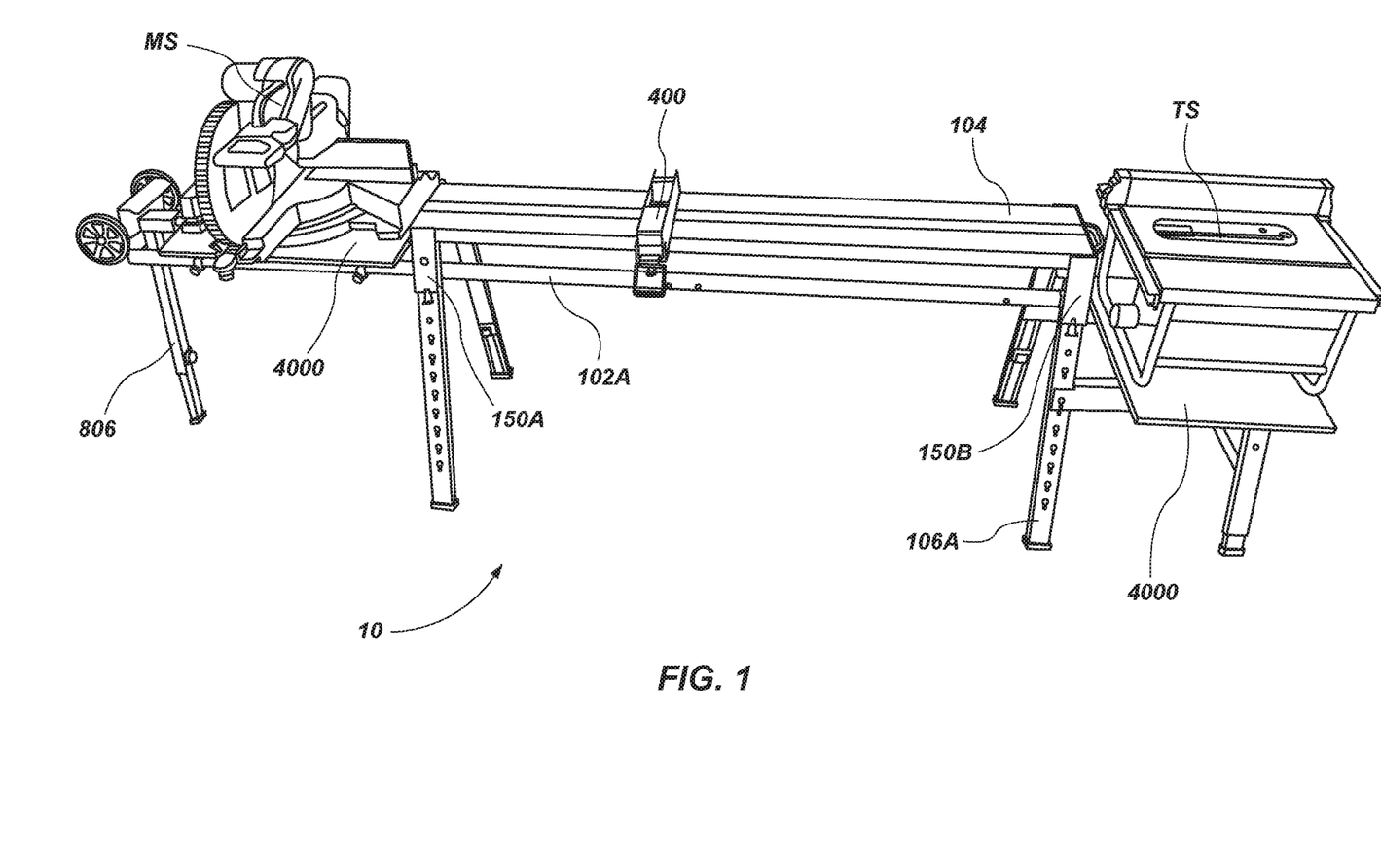
FIG. 1 is perspective side view of a first embodiment of an assembled miter saw support system in accordance with the present disclosure.
Figure 1A:
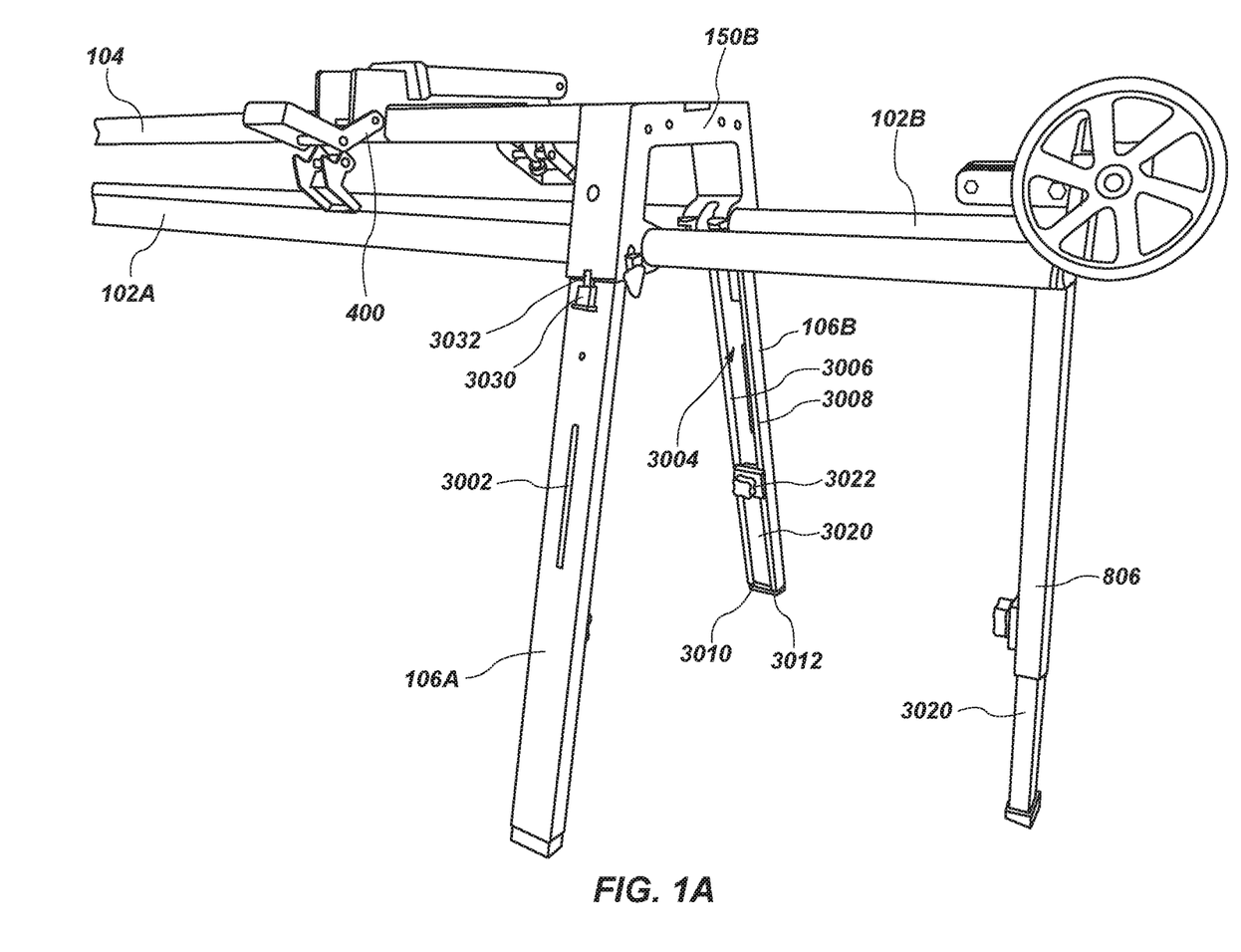
FIG. 1A is a perspective view of a portion of the system of FIG. 1 to show additional details thereof.

Referring to FIGS. 1 and 1A, a first embodiment of a system 10 in accordance with the present disclosure is depicted. In the depicted embodiment, the system 10 is assembled and configured to support a miter saw assembly MS and a table saw assembly TS. It will be appreciated that the depicted embodiment may be a collapsible and transportable system that may be configured in multiple ways.

In the depicted embodiment system 10 has a central table assembly 100 with two opposite main nodes 150A and 150B at either end that support an upper bench top 104 therebetween. On illustrative example of a main node 150 is depicted in isolation in FIGS. 3A and 3B. A tabletop recess 2004 open on the interior surface in the upper central portion 2002 of the node is configured to conform to, and receive, an end of tabletop 104 therein. Fastener holes 2014 passing through the exterior surface to the recess 2004 allow a fastener such as the depicted bolts to retain the tabletop therein. In one conformation, the tabletop 104 may be connected to two main nodes by fasteners and maintained in that position for long term storage and use. A ruler notch RN may be used to extend ruler from the tabletop to the end of the node 150.

Figure 3A:
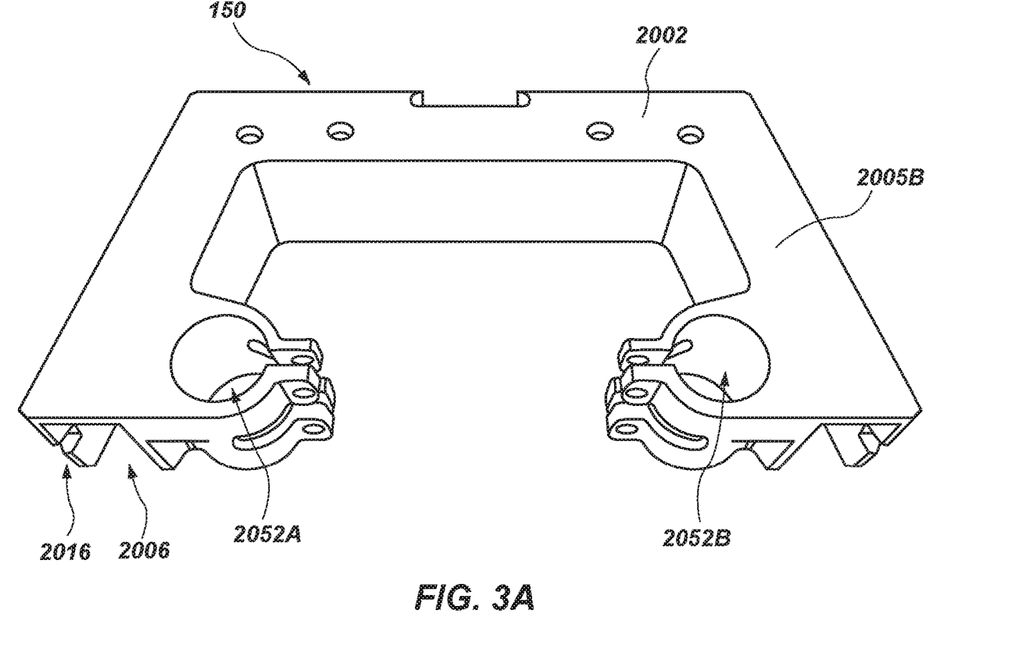
FIGS. 3A and 3B are front and rear views of a main node for a system in accordance with the present disclosure, such as those depicted in FIG. 1 or FIG. 2.
Figure 3B:
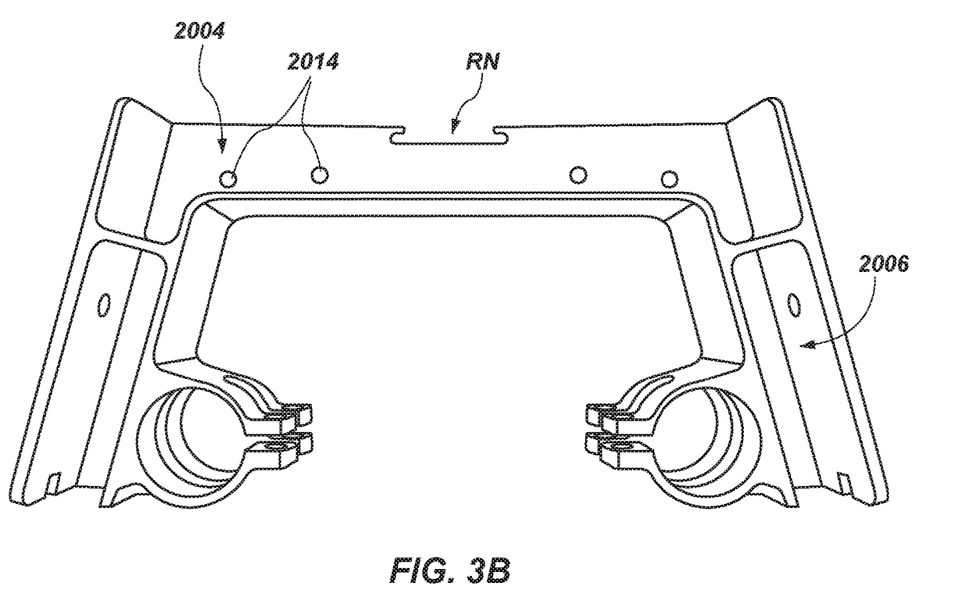

Opposite lower arms 2005A and 2005B each contain a leg recess 2006 open on the interior and lower surfaces of the node 105 for receiving a supporting leg 106. A securing notch 2016 formed in the sidewall of the node into the leg recess 2006 allows for releasable attachment to a leg.

A best depicted in FIG. 1A, two legs 106A and 106B extend from each main node, when assembled to support the table. Each leg may be adjustable in height, having a main section 3002 that may be generally C shaped to surround a central channel 3004 having a cross-sectional shape that may correspond to the central channel 3004 leading up from a lower foot 3012 may be disposed in the leg 106. A retaining plate 3020 may be attached to the insert 3010 by a clamp handle 3012, as by turning a threaded bolt. When an insert is moved to a desired height, the flanges 3006 and 3008 may be compressed between the retaining plate 3020 the front of the insert to maintain the leg at a desired height.

Additionally, each leg 106 may be rotatably attached to the main node, such that when not deployed for use, the leg 106 may be rotated to a storage position parallel to the tabletop. For example, each leg may be secured in the leg recess 2006 by a pin or hinge allowing the rotation. The recess 2006 and leg may be constructed to stop rotation at a desired position for both use and storage. This may allow the table to be folded for storage and transport.

A slidable clasp member 3030 having an upper locking tab 3032 may disposed on the outer surface of the leg 106. A corresponding spring assembly may be disposed in the central channel to maintain the clasp in an extended position. When the leg 106 in inserted into a leg recess on a main node 105, the upper locking tab may be urged into the securing notch 2016 to hold the leg 106 in the correct position.

Main node 105 further may further include two rail brackets 2052A and 2052B. As depicted, each rail bracket 2052 may be disposed on a lower arm 2005 interior to the leg recess. In the depicted embodiment, each bracket maybe formed with a round cross-sectional shape and a clamping closure for use with a tubular rail. It will be appreciated that in other embodiments, different shaped brackets may be used with other rails.

Returning to FIGS. 1 and 1A, two parallel support members 102A and 102B extend through the main nodes 105 underneath the bench top 104. As depicted, the parallel support members may be formed as tubular rails or pipes. The parallel support members 102A and 102B may extend past the nodes 105.

Figure 2:
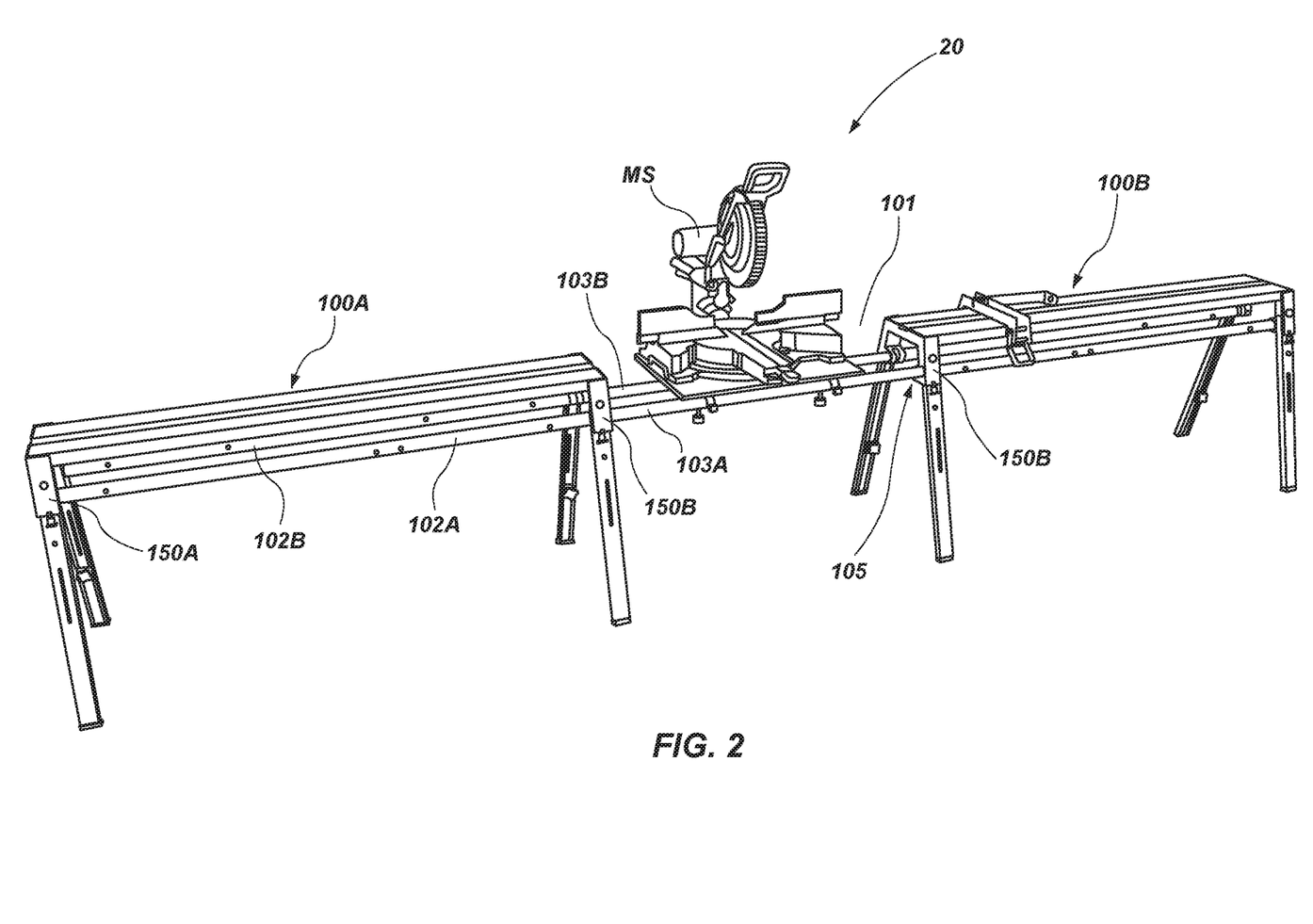
FIG. 2 is perspective side view of a second embodiment of an assembled miter saw support system in accordance with the present disclosure.

Turning to FIG. 2, a second embodiment of a system 20 in accordance with the present disclosure is depicted. Like items are noted with the same reference numerals as in FIGS. 1 and 1A. In the depicted embodiment, the system 20 is assembled and configured to support a miter saw assembly MS. It will be appreciated that the depicted embodiment may be a collapsible and transportable system that may be configured in multiple ways.

In the depicted embodiment system 20 has a left table assembly 100A and a right table assembly 100B. Each table assembly 100A or 100B may be the same central table assembly 100 of FIG. 1, each having two opposite main nodes 150A and 150B at either end that support an upper bench top 104 therebetween, with two legs 106A and 106B extending from each main node, when assembled to support the table.

Two parallel support members 102A and 102B extend through the main nodes 105 underneath the bench top 104. As depicted, the parallel support members may be formed as tubular rails or pipes. The parallel support member 102A and 102B may extend past the nodes 105 to join the two table assemblies 100A and 100B with a miter saw support space 101 disposed therebetween.

In one exemplary embodiment, the portion of the tubular rails 102A and 102B that spans the miter saw support space 101 to connect the two table 100A and 100B, may be formed as telescoping sections 103A and 103B of tubing that telescope into the tubing 102A and 102B under a bench top 104 of a table assembly 100A or 100B (through a first main node), and extend out therefrom to corresponding sockets 105 in the second table assembly (which may be formed on a main node 150C). Socket 105 may be an extension or adaptation of a rail bracket 2052. The telescoping tubular sections 103A and 103B may be secured in place by spring loaded pins that are disposed therein through holes in the sidewalls thereof, or as is otherwise known in the art. For storage, the telescoping sections maybe released from the sockets and returned to inside the tubular sections underneath the table assembly.

Figure 4A:
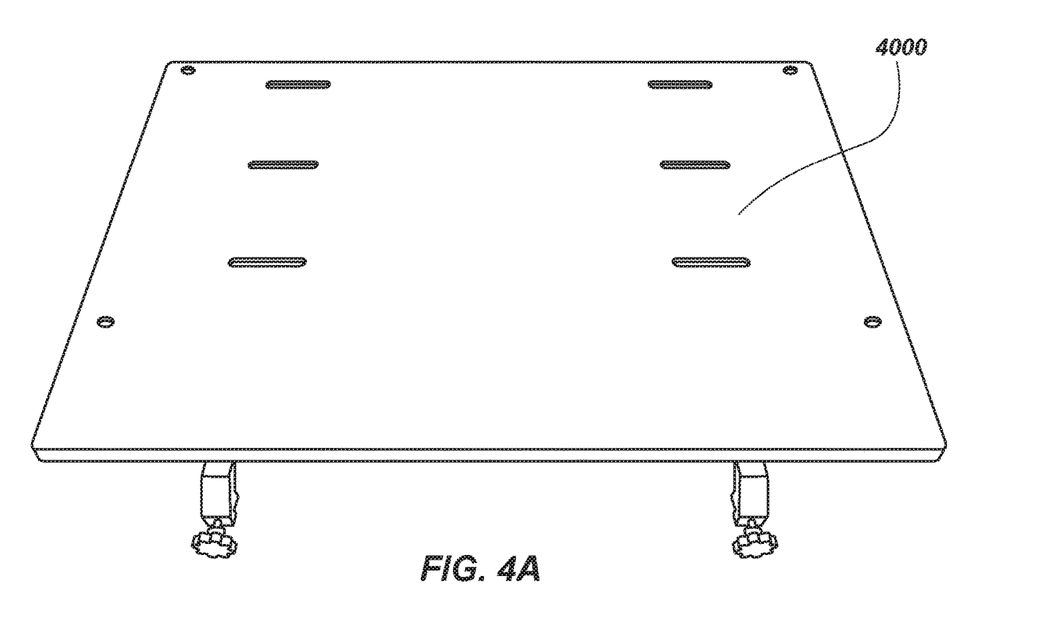
FIGS. 4A and 4B are top perspective and rear side perspective views of a saw support table with miter saw support brackets for the systems of FIG. 1 or FIG. 2.
Figure 4B:
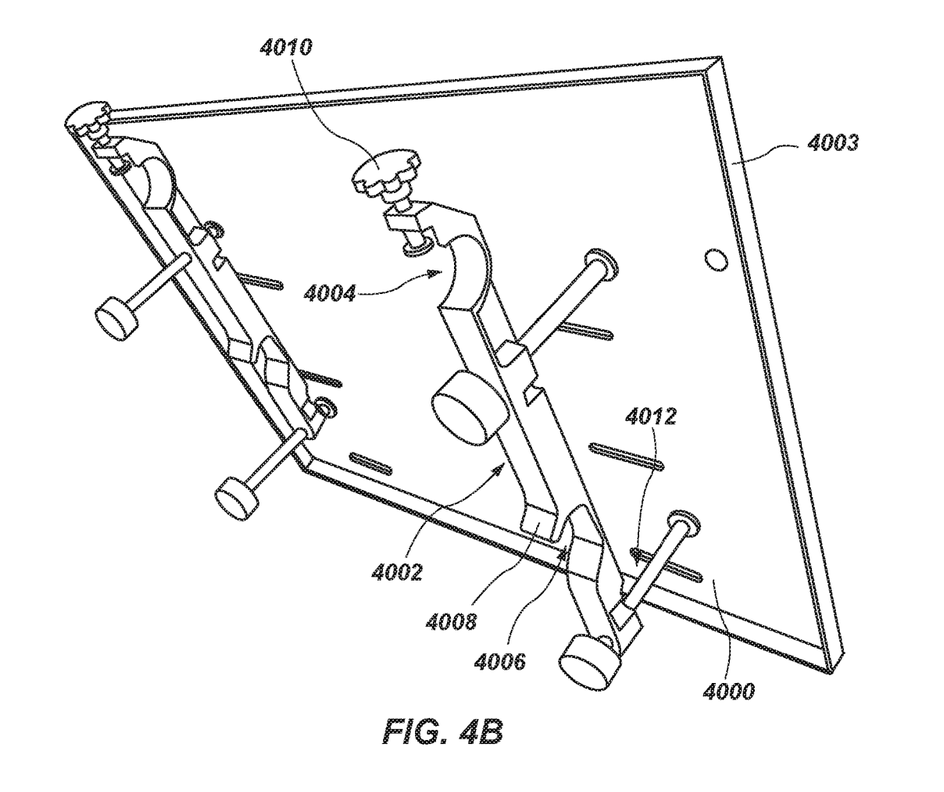

A saw support table 4000 may be removably securable to the parallel support members 102A and 102B extending out past a table assembly 100, as depicted in FIGS. 1, 1A and 2. Turning to FIGS. 4A and 4B, the details of one illustrative embodiment of a saw support table are depicted. A planar tabletop 4000 having slots and attachment holes formed therein to allow a miter saw assembly MS to be secured thereto is depicted. As depicted, the lower surface 4001 may have a protruding lip 4003 extending downwards around the edge thereof.

A plurality of rail attachment brackets 4002 are disposed on a lower surface of the tabletop 4000. Each bracket 4002 may be attached to the tabletop by adjustable legs 4012 to allow the height of the table to be adjusted such that the cutting table of the miter saw MS may be co planar with tabletop 104 on installation.

Each bracket 4002 includes a rear rail slot 4008 and a front rail slot 4004 for placement over the parallel support members 102A and 102B. The lower surface of the bracket 4002 may be sloped rear of the rear rail slot and include a rear rail catch formed as an extension at the front of the rear rail slot to allow the bracket to be placed on the rear rails with a in a tilted slidable manner, and then lowered so the front slot 4004 is disposed over the front rail. A clamp member 4010 may be used to secure the bracket to the front rails.

As depicted in FIGS. 1 and 1A, the parallel support members 102A and 102B may connect to an end bracket 800 with an upper shelf 802 that may be adjusted coplanar with the table top 104 and a leg 806 that is adjustable similar to leg 106 to support the miter saw MS assembly. As depicted in FIG. 2, the parallel support members may extend to a second table assembly on an opposite side of the saw support table.

In one exemplary embodiment, the parallel support members may be joined to one another using a specialized folding bracket to allow shortening for storage and transport and additional support. In connection with the folding table legs 106 and hinged nodes, this can allow an extended table to be folded into a compact unit with the legs and parallel support members secured inside flat tabletops for storage and transport.

Figure 5A:
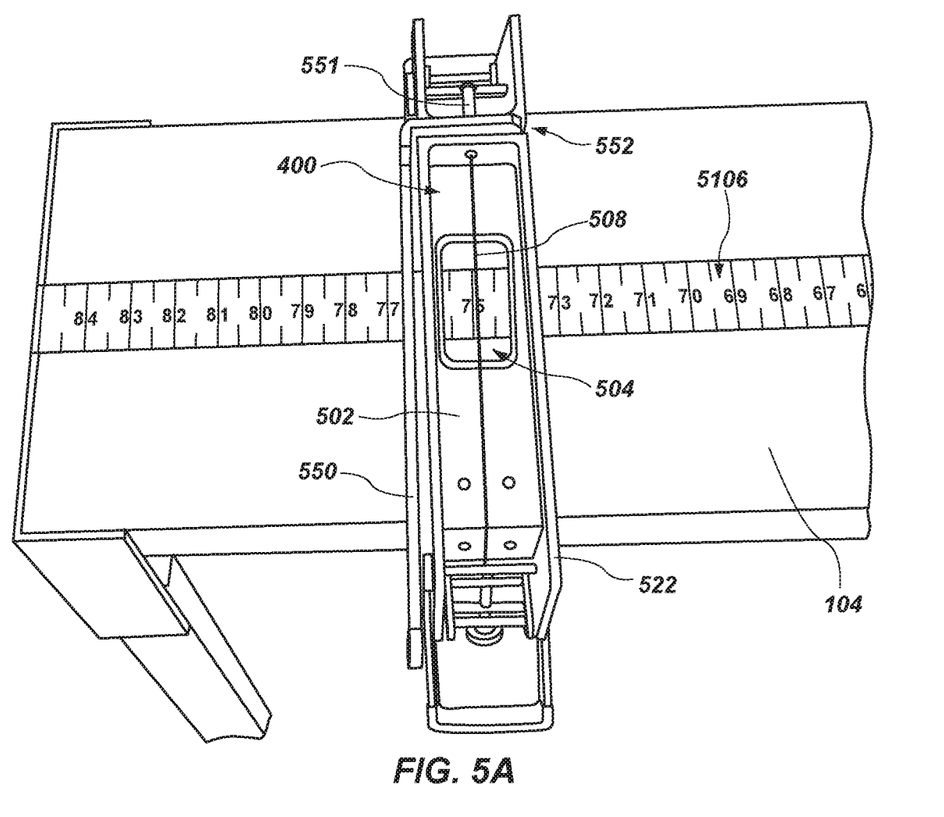
FIGS. 5A, 5B, and 5C are installed top, bottom side, and installed top with extension deployed views of sliding stop for the systems of FIG. 1 or FIG. 2.
Figure 5B:
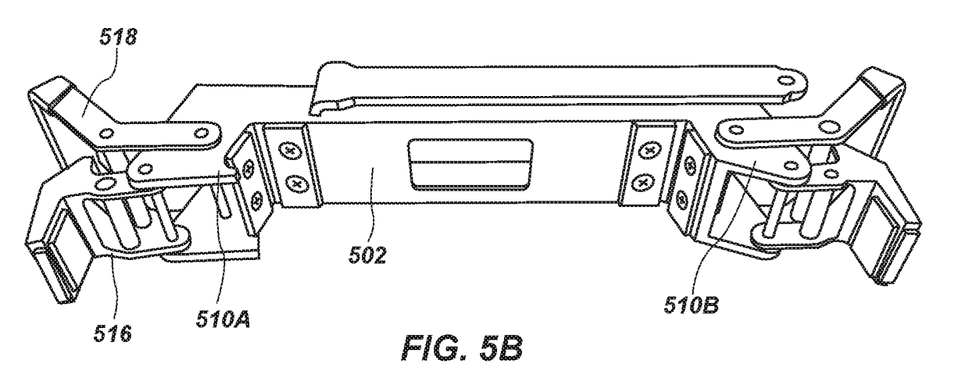

A sliding locking member 400 may be attached to the bench top 104 and used to define a fixed distance for the length of material being cut. As best depicted in FIGS. 5A and 5B, the sliding stop 400 has a body with a central section and two extending sides 510 that define a bottom recess to conform to the tabletop. One or more portions may be lined with a material for facilitating sliding and clamping as depicted.

On either side a clamp assembly including a clamp member that 416 that wraps under and compresses to the inner side of the tabletop and an actuating handle 418 with a linkage therebetween. A window 504 is formed in the central portion and includes a marking line 508. The window and marking line may be formed from a transparent material with a line disposed thereon. A ruler 5106 disposed on the tabletop may be viewed using the window. When miter saw MS is installed, the table top 4000 may be slidably adjusted before securing to the rails such that the ruler 5106 reading at the marking line 508 corresponds to the distance of the side edge 522 of the sliding stop 400 from the cutting blade of the saw MS. Thus, when the sliding stop is secured in a desired position, the sliding stop will securely maintain material to be cut at the desired length for repeated cuts.

Figure 5C:
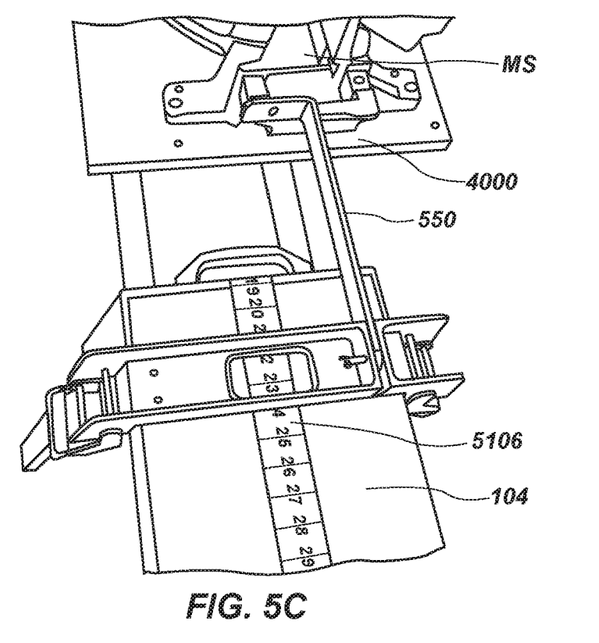

Additionally, as depicted at 5C, a measurement extension arm 450 may be removably attached to the sliding top. It will be appreciated that the sliding stop may only be secured to the tabletop within a fixed distance from the cutting blade of the miter saw MS. In order to repeatedly make secured measured cuts for the blade at a short distance, the extension arm may be removably attached to the sliding stop as depicted in FIG. 5C and bridge the distance by a fixed amount. In the depicted embodiment, the extension arm 550 has an ending sidewall at a distance of 10 inches from the sidewall of the stop 400. When not in use, it may be stowed as depicted in FIGS. 5A and 5B, with a removable cotter pin 551 used to secure it in either the useful or stowed position in the arm recess 552.

Returning to FIG. 1, in some embodiments, system 10 may further include a second saw support table 6000 secured to a portable table saw TS disposed on folding adjustable legs attached to the legs 106 extending from a main node 105 such that the with the table saw TS table is coplanar with the bench 104 top. As depicted in more detail in FIG. 6, two folding legs 6008A and 6008B each have an upper section 6022 hingedly attached to a lower leg 6024. Lower leg 6024 may be adjustable in height in the same fashion as leg 106 discussed previously herein. The upper section 6022 may be attached thereto via hinge 6026 to be rotated thereon for storage and therefrom to a generally orthogonal position to form a support rail. At the distal end, upper section 6022 may be attached to the leg 106. In the depicted embodiment, this may be accomplished by placing a slot 6040 formed in the lower portion of the upper section over a fastener 6032 disposed in the leg 106. It will be appreciated that, as depicted, the fastener 6032 may be moved to different positions to allow adjustment of the height of the leg assembly.

Figure 6:
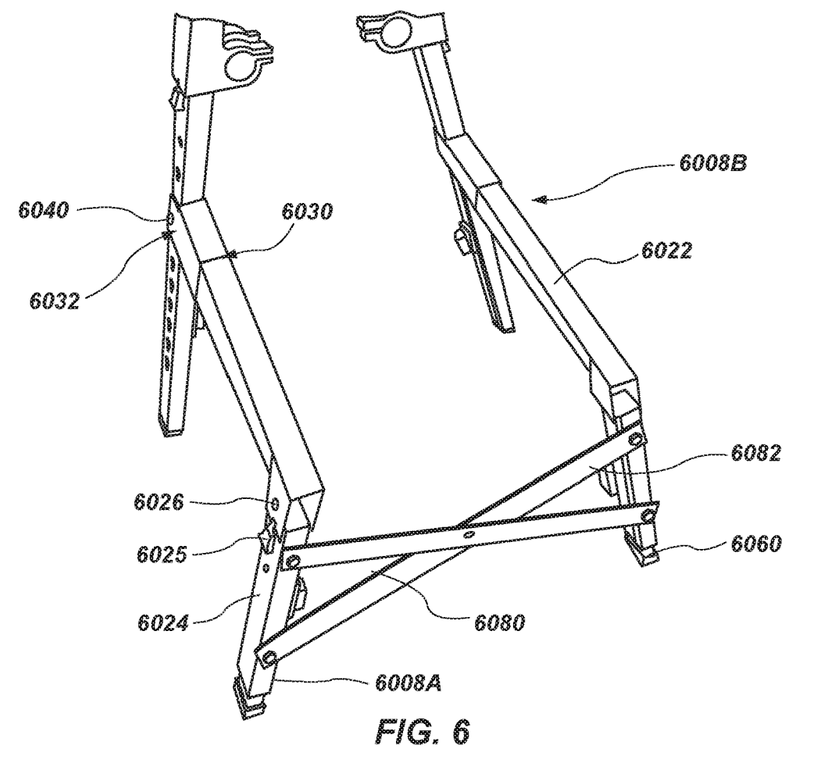
FIG. 6 is a top perspective view of a table saw stand for attachment to the systems of FIG. 1 or FIG. 2.

The two legs 6008A and 6008B may be secured to one another by a brace assembly 6080. As depicted brace assembly may have angled braces 6081 and 6082 extending across the legs 6008A and 6008B. As depicted, the various members of the brace assembly may be removably secured the legs 6008 using suitable fasteners.

As depicted, the upper section may be secured in either the deployed or stowed position using a sliding clasp, in a similar fashion to that discussed with respect leg 106 previously herein. A tabletop securing slot 6030 may be formed in the upper section 6022 to retain the lower lip 4003 of the saw table 4000 therein. At an opposite end of the tabletop 4000, the lower lip 4003 may be retained against the proximal end of the upper section.

Figure 7A:
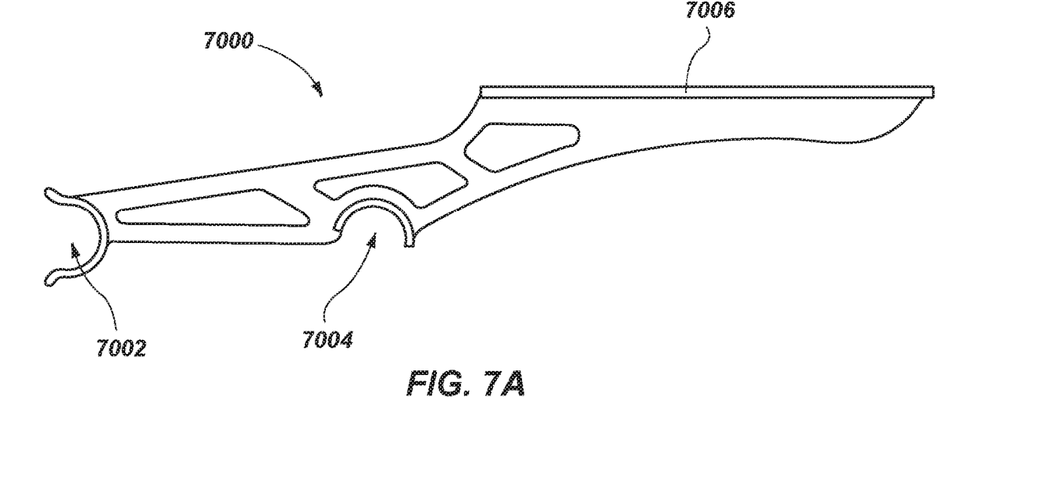
FIG. 7A is a side view of a support bracket for an additional side work surface.
Figure 7B:
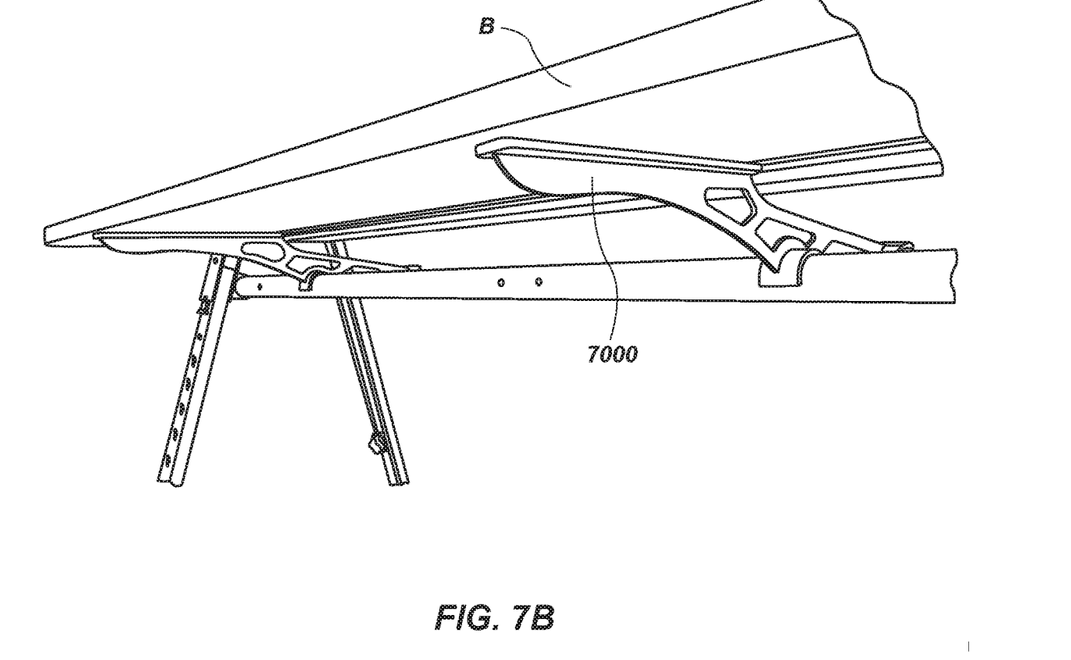
FIG. 7B is a bottom side perspective view of an installed side work surface.

Turning to FIGS. 7A and 7B, an additional work surface support B for use with system 10 is depicted. As shown in FIG. 7A, a bracket 7000 that may be placed over the parallel support members to support an additional work surface parallel to the bench top is depicted. Bracket 7000 has a rear rail connection portion 7002 formed as body having a shape conforming to a rail 102 from an open rear end. A front rail connector 7004 is similarly formed as body having a shape conforming to a rail 102 from an open accessible on a lower surface of the bracket 7000. In the depicted embodiment for use with round rails, the rear rail connector may be placed on the rail 102B further away from a user and then the bracket rotated downwards to rest on the rail 102A closer to the user with the rail 102A positioned in the front rail connector 7004, as depicted in FIG. 7B.

Distal to the front connector, a work surface support portion 7006 with a planar top for supporting a work surface is disposed. The work surface portion extends out and up from the remainder of the bracket to support a suitable work surface parallel to the tabletop 104. In the depicted embodiment, the work surface may be a suitable board B, such as a 2×10 or 2×12. The work support portion 7006 may include suitable structures, such as apertures for fasteners, to allow brackets 7000 to be secured to the board B for use and storage.

While this disclosure has been described using certain embodiments, the present disclosure can be further modified while keeping within its spirit and scope. This application is therefore intended to cover any variations, uses, or adaptations of the disclosure using its general principles. Further, this application is intended to cover such departures from the present disclosure as come within known or customary practices in the art to which this invention pertains and which fall within the limits of the appended claims.

The invention claimed is:

1. A collapsible and transportable system for a miter saw assembly comprising:
    at least a first table assembly comprising
        an upper bench top formed as an elongated planar member extending from a first end to a second end,
        at least four legs that extend downwards underneath the upper bench top in a deployed conformation,
        a plurality of parallel support members disposed below the upper bench top and which extend past the first end in a deployed conformation to define a saw table mounting space;
    a removable saw support table comprising
        a table-top,
        at least a first bracket attached to the table-top and configured for placement on the parallel support members in the defined saw table mounting space, wherein the at least first bracket is adjustable such that a cutting table on a miter saw secured to the table-top can be adjusted to be co-planar with the upper bench top; and
    a sliding locking member which is adjustably securable to the upper bench top to define a fixed distance for a length of material being cut on the miter saw.

2. The system of claim 1, wherein in a deployed confirmation, the parallel support members extend to a second table assembly.

3. The system of claim 1, wherein in an undeployed confirmation, the portion of the plurality of parallel support members defining the saw table mounting space are retracted into the plurality of parallel support members disposed below the upper bench top.

4. The system of claim 1, wherein an undeployed confirmation, the portion of the plurality of parallel support members defining the saw table mounting space are folded below the upper bench top.

5. The system of claim 1, wherein the at least first table assembly further comprises a first main node member disposed at the first end of the upper bench top and a second main node member disposed at the second end of the upper bench top.

6. The system of claim 5, wherein the plurality of parallel support members extends through a plurality of guide channels formed in the first main node member.

7. The system of claim 5, wherein at least two legs extend from each main node to support the table.

8. The system of claim 7, wherein the at least two legs fold to an undeployed position underneath the upper bench top.

9. The system of claim 1, further comprising a second saw support table secured to a portable table saw disposed on folding adjustable legs attached to table assembly at the second end with a table of the table saw coplanar with the upper bench top.

10. The system of claim 1, further comprising at least a first additional work-table assembly, comprising
an elongated member having a generally planar upper surface and
at least a first work-table bracket attached to the elongated member, the at least first work-table bracket configured for placement on the parallel support members underneath the upper bench top, such that the elongated member is generally parallel to the upper bench top and the generally planar upper surface is coplanar with the upper bench top.

11. The system of claim 1, wherein the at least first bracket attached to the table-top and configured for placement on the parallel support members in the defined saw table mounting space comprises a plurality of brackets attached to the table-top and configured for placement on the parallel support members in the defined saw table mounting space.

12. The system of claim 1, wherein the at least first bracket is adjustable by one or more threaded shafts attaching the at least first bracket to the table-top.

13. A portable workbench system comprising:
at least a first table assembly comprising
an upper bench top formed as an elongated planar member extending from a first end to a second end,
a first main node member disposed at the first end and a second main node member disposed at the second end,
at least two parallel support members disposed below the upper bench top and which extend through a plurality of guide channels formed in the first main node member past the first end in a deployed conformation to define a saw table mounting space; and
a sliding locking member which is adjustably securable to the upper bench top to define a fixed distance for a length of material being cut with a saw disposed in the saw table mounting space.

14. The system of claim 13, further comprising at least two legs extending from each of the first main node member and the second main node member in a direction downwards from the upper bench when placed in a deployed position.

15. The system of claim 13, wherein the at least two legs fold to an undeployed position underneath the upper bench top.

16. The system of claim 13, wherein in an undeployed confirmation, the portion of the plurality of parallel support members defining the saw table mounting space are disposed below the upper bench top.

17. The system of claim 13, further comprising a removable saw support table comprising a table-top and at least a first adjustable bracket attached to the table-top and configured for placement on the parallel support members in the defined saw table mounting space.

18. The system of claim 13, further comprising a table-saw support table secured to a portable table saw disposed on folding adjustable legs attached to the at least first table assembly at the second end.

19. The system of claim 13, further comprising at least a first additional work-table assembly, comprising
an elongated member having a generally planar upper surface and
at least a first work-table bracket attached to the elongated member, the at least a first work-table bracket configured for placement on the parallel support members underneath the upper bench top, such that the elongated member is generally parallel to the upper bench top and the generally planar upper surface is coplanar with the upper bench top.

20. The system of claim 1, wherein the at least first bracket attached to the table-top and configured for placement on the parallel support members in the defined saw table mounting space comprises a plurality of brackets attached to the table-top and configured for placement on the parallel support members in the defined saw table mounting space.

* * * * *